Feb. 23, 1954     S. BRICE     2,670,449
ELECTRIC MOTOR
Filed Oct. 4, 1952

INVENTOR.
SAM BRICE
BY
Glenn L. Fish
Attorney

Patented Feb. 23, 1954

2,670,449

UNITED STATES PATENT OFFICE 2,670,449

ELECTRIC MOTOR

Sam Brice, Spokane, Wash., assignor of one-half to Thomas J. McMahon, Spokane, Wash.

Application October 4, 1952, Serial No. 313,140

1 Claim. (Cl. 310—209)

This invention is an electric motor which is adapted to automatically connect and disconnect its driving shaft to a load when energized and de-energized respectively.

The invention has for its principal object the provision of an electric motor which is adapted to automatically operate a clutch whereby the torque of the motor may be imparted to a driven shaft when the motor is energized, yet will release the shaft when the motor is de-energized and thus eliminate coasting of the driven shaft.

Another object of the invention lies in the provision of a longitudinally reciprocable rotor in the motor which is normally offset from the longitudinal center of the energizing stators and which is drawn toward a substantially aligned position when the stators are energized and simultaneously produces torque in the rotor.

Another object of the invention lies in the provision of a spring loaded pressure foot which is adapted to shift the rotor away from longitudinal alignment with the stator and which is rendered inoperative when the stator is energized.

These and other objects of the invention will become apparent during the course of the following description.

In the accompanying drawings like numerals are employed to designate like parts.

Figure 1:
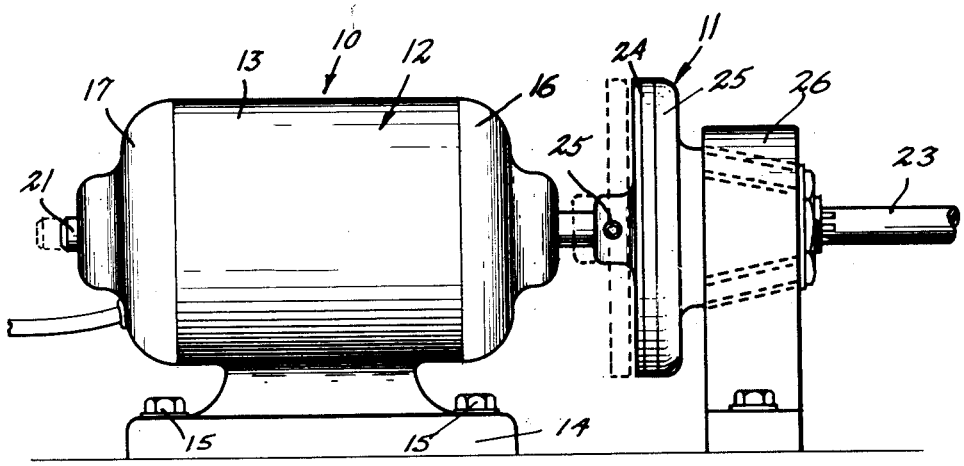
Figure 1 is a side elevation of the improved motor and associated clutch.
Figure 2:
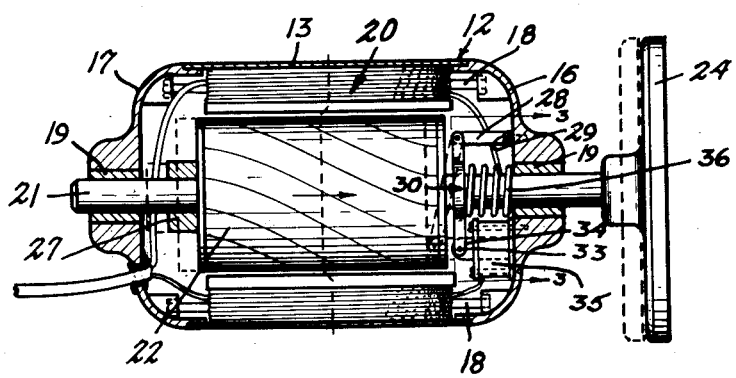
Figure 2 is a longitudinal vertical cross section taken through the improved motor.

Referring now more particularly to the drawing, the numeral 10 indicates in general my improved motor and numeral 11 indicates a clutch operated by the motor. It will be understood that any desired mechanical connector suitable for the purpose herein described may be used in combination with my improved motor and it is not my intention to limit my invention to any specific clutch or connecting mechanism except as required by the appended claim.

The motor constituting the subject matter of this invention is provided with a housing 12 which may be of any desired construction, but, as illustrated here, has a sleeve 13 supported by base 14 adapted to be secured to a supporting surface by means of bolts or lag screws 15. Front and rear end plates 16 and 17 are disposed in covering relation to the open ends of the sleeve 13 and are secured by bolts 18 which extend longitudinally through the sleeve, said end plates and sleeve constituting a supporting frame for bearings 19, of the sleeve type, which are coaxial with the housing sleeve 13.

Within the sleeve 13 is secured an annular stator 20 which may comprise a multiplicity of stator elements as are common in present day practice for motors. The bearings 19 are axially aligned and longitudinally spaced from each other and carry a driving shaft 21 for reciprocative and rotary movement of the shaft. Fixedly secured on the shaft 21 intermediate to bearings 19 is a rotor 22 which may be of any desired construction, preferably of laminated metal, and this rotor is disposed within the influence of the magnetic field produced by the stator when electrically energized, yet is normally offset from longitudinal alignment with said stator. Therefore, when the stator 20 is energized the field acts upon the rotor 22 and urges it to seek longitudinal alignment with the stator and simultaneously produces torque in the rotor.

By providing a mechanical connector of some type on the front end of shaft 21, a mechanical connection may be made between the driving shaft 21 and a work load or driven shaft 23. The connector illustrated is a clutch comprising a clutch plate 24 removably secured by common means such as a set bolt 25 to the end of the shaft 21. The clutch plate 24 therefore is seen to reciprocate with the movement of driving shaft 21, and when the shaft 21 is extended forwardly plate 24 frictionally engages the face of clutch head 25, which is rotatably carried in a bearing support 26 having the bearing of the type adapted to support for thrust as well as torque. The forward movement of the driving shaft 21 and rotor 22 may be controlled by positioning the uniting surfaces of the connector or clutch 11 since it is desired that no frictional drag be applied against the torque of the driving shaft 21 when the motor 10 is energized. However, to limit the rearward movement of shaft 21 I have provided a spacing sleeve 27 which encircles the rear portion of shaft 21 and is adapted to bear against the inner face of end plate 17 and prevent rotor 22 from contacting end plate 17.

Figure 4:
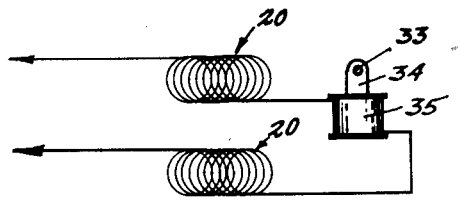
Figure 4 is a schematic wiring diagram.
Figure 3:
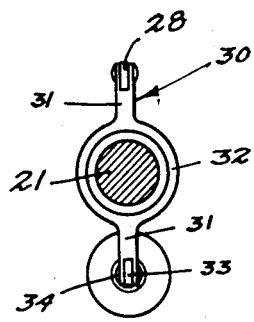
Figure 3 is a fragmentary cross section as at line 3—3 of Figure 2.

When it is found necessary to mount the motor with the axis vertical and the clutch 11 disposed below the motor, a means of shifting the rotor 22 and shaft 21 to disengage the clutch must be provided. I have found an adequate means for doing this comprising a supporting arm 28 disposed spaced from and extending parallel with shaft 21 and which is secured by bolts 29 to the inner face of front end plate 16. Pivotally connected at the outer end of arm 28 is a pressure foot 30 which has diametrically opposed fingers 31 united by an annular ring 32 which is adapted to encircle the driving shaft 21. The finger 31 opposed to arm 28 is pivotally connected at 33 to the plunger 34 which is magnetically influenced by a coil or field 35. A helical expansion spring 36 encircles the driving shaft 21 and is disposed between the pressure foot 30 and inner face of end plate 16 and urges pressure foot 30 rearwardly against rotor 22. As shown in Figure 4, the coil or energizing field 35 for plunger 34 is connected in series with the windings of stator 20 so that when electricity is connected to the stator the field 35 is simultaneously energized and draws plunger 34 inwardly compressing expansion spring 36 and shifting pressure foot 30 away from rotor 22, thereby permitting reciprocative movement of the rotor toward its front end and permitting frictional engagement of the clutch 11.

I have found that there are many mechanical applications in which a motor is used to drive and in which it is desirable to stop the rotation of the load or driven shaft substantially at an instant, but with the kinetic energy produced by the revolving rotor and driving shaft 21 after the stator has been de-energized a friction brake is required, and because of its added work in stopping the shaft 23 the brake is often in need of relining. By eliminating the greater portion of the torque after the motor is de-energized, the shaft 23 may be much more easily stopped.

Of course, there are many other uses to which my invention may be applied and I desire to protect the invention for any use to which it is susceptible of application.

Having thus described my invention I claim:

In an electrically operated motor having a reciprocable driving shaft adapted to shift forwardly when energized and engage a mechanical clutch, said shaft having a rotor fixedly secured thereon, means for shifting said rotor rearwardly when the motor is de-energized comprising a resiliently supported pressure foot disposed to bear against said rotor and move it rearwardly, and an electrically energized coil having a plunger secured to said pressure foot and actuated by said coil to shift said pressure foot away from said rotor, said coil being electrically connected to the motor energizing circuit to energize the coil simultaneously with the motor.

SAM BRICE.

References Cited in the file of this patent

UNITED STATES PATENTS

| Number | Name | Date |
| --- | --- | --- |
| 453,260 | Kells | June 2, 1891 |
| 1,035,535 | Coleman | Aug. 13, 1912 |
| 1,274,575 | Midgley | Aug. 6, 1918 |
| 2,204,065 | Beizer | June 11, 1940 |